United States Patent [19]

Bull et al.

[11] Patent Number: 4,523,308
[45] Date of Patent: Jun. 11, 1985

[54] TELEPHONE CONCENTRATOR SWITCH ARRANGEMENT

[75] Inventors: John Bull, Lithia; Leon Croft; David B. DeVaney, both of Longwood; Russell R. Davis, Geneva; David L. Hinshaw; Haresh C. Jotwani, both of Longwood; Ronald J. Kandell, Winter Springs; Richard F. Kurtz, Longwood; Ernest O. Lee, Jr., Longwood; Gunter F. Neumeier, Longwood; Glenn L. Richards, Longwood; Richard Scott, Longwood, all of Fla.

[73] Assignee: Stromberg-Carlson Corporation, Lake Mary, Fla.

[21] Appl. No.: 427,513

[22] Filed: Sep. 29, 1982

[51] Int. Cl.³ .......................................... H04Q 11/04
[52] U.S. Cl. ........................................ 370/56; 370/58
[58] Field of Search .......................... 370/56, 58, 68; 179/18 FC

[56] References Cited

U.S. PATENT DOCUMENTS 4,232,386 11/1980 McDonald et al. .................. 370/56
4,288,870 9/1981 McDonald et al. .................. 370/56
4,327,436 4/1982 Ohara et al. ......................... 370/56
4,428,042 1/1984 Niethhammer et al. ............. 370/56

FOREIGN PATENT DOCUMENTS 0075305 3/1983 European Pat. Off. .

Primary Examiner—Douglas W. Olms
Attorney, Agent, or Firm—Cesari and McKenna

[57] ABSTRACT

A line switch including a concentrator arrangement for coupling telephone calls between a plurality of subscriber lines and a plurality of port group highways to a central office switching network in a telephony system. The analog voice signals are first digitized and multiplexed into time slot channels on line group highways for transfer to the concentrator arrangement. The concentrator arrangement couples the digitized voice information signals between time slot channels on any of the line group highways and any of the port group highways. The line switch includes control circuitry that selects the time slot channel, line group highway and port group highway to couple the digitized voice information signals between the subscriber line and the central office matrix switch through the concentrator.

24 Claims, 17 Drawing Figures

PORT GROUP HIGHWAY
TIME SLOT RAM

LINE SWITCH CONTROLLER 36

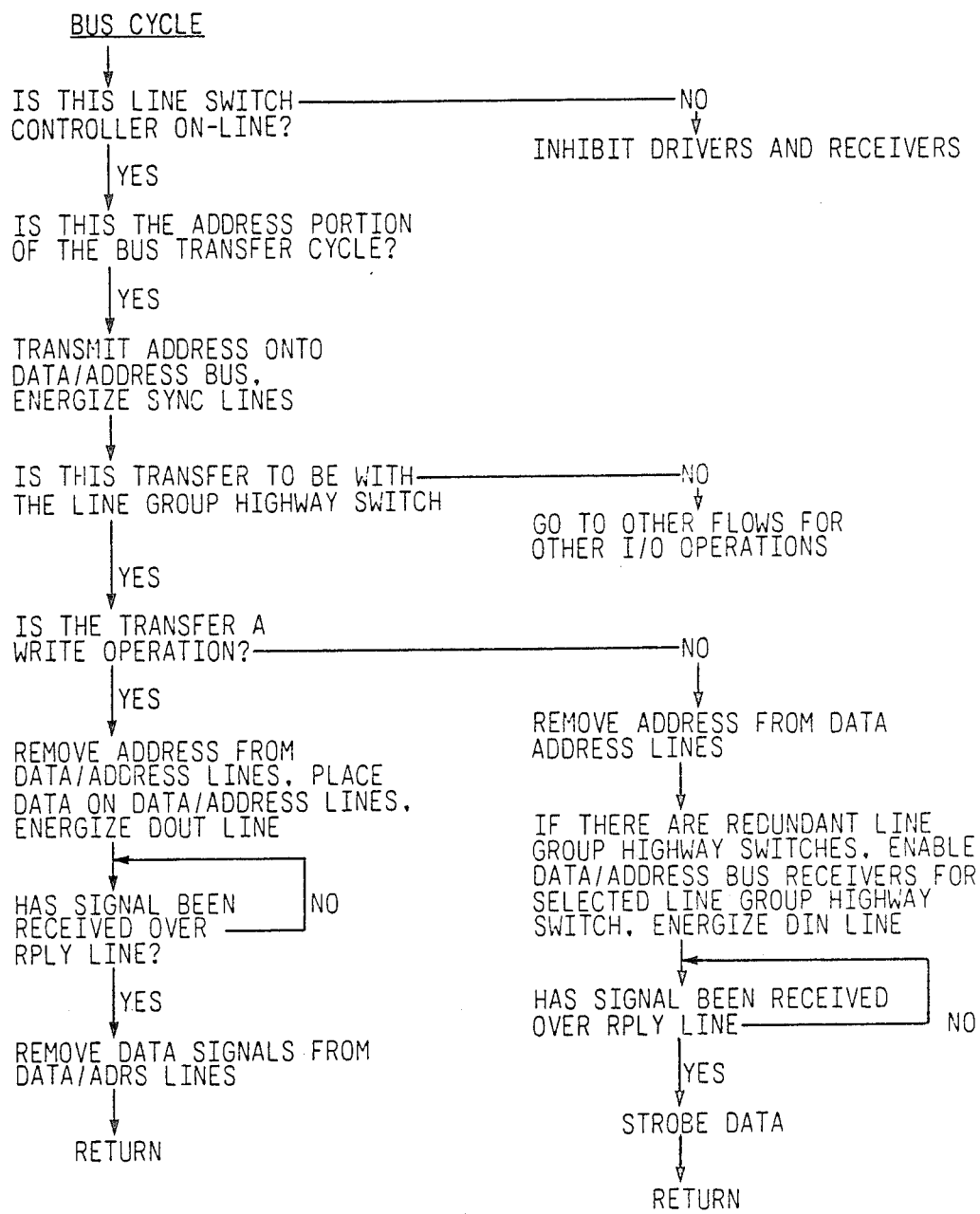

LINE GROUP HIGHWAY BUSY/IDLE MAP

PORT GROUP HIGHWAY
BUSY / IDLE MAP

VOICE PATH ASSIGNMENT TABLE

PATH SELECTION SEQUENCE

TELEPHONE CONCENTRATOR SWITCH ARRANGEMENT

BACKGROUND OF THE INVENTION

1. Field of the Invention

This invention generally relates to telephony networks and, more specifically, to a telephony switching system that incorporates concentrators for multiplexing calls from a large number of telephone subscriber lines onto a substantially reduced number of highways for transfer to a central office switching network.

2. Description of the Prior Art

U.S. patent application Ser. No. 507,935, filed June 23, 1983, discloses a telephony network that includes a digital central office for performing switching operations. In this network, telephone lines from subscribers and trunk circuits from other central offices connect directly to a digital central office through a plurality of line and trunk circuits in port group units. Each connection is made through conventional tip and ring, or similar, conductors that extend from each individual subscriber or remote central office to the location of the digital central office. These conductors carry signals in analog form that represent voice signals, data, or other user information, herein generally referred to as voice information, and supervisory information. The supervisory information may be "sense supervisory" information, including hook status and dial pulse information received from the subscriber, or "control supervisory" information, including ringing and other control signals that are sent over the subscriber line or that cause certain operations to be performed on the subscriber telephone.

Each port group unit in the central office described in U.S. patent application Ser. No. 507,935 connects directly to a plurality of telephone subscriber lines through individual port circuits, such as line or trunk circuits. Each port circuit converts incoming analog voice signals to digital form that are transferred in a serial pulse train and multiplexed onto a port group highway with signals from other subscriber lines. Sense supervisory information, in digital form, is also multiplexed onto this pulse train. A time slot interchange (TSI) matrix network receives the pulse train and strips the incoming sense supervisory information for storage in an area of a port data store that is assigned to each port circuit. A port event processor samples the information in each port data store area, processes the information and uses it to send messages to a call control processor. The call control processor sends information, including commands, to the individual areas of the port data store to enable the port event processor to control the corresponding telephone subscriber line and to the TSI matrix network for establishing a switching channel through the network to establish a path for the digitized voice signals to the port serving a called subscriber line.

Commands to the port event processor from the call control processor enable the transmission of a dial tone, termination of a dial tone, or ringing signals to be applied to the calling and called subscriber lines. The port event processor generates control supervisory information in response to these commands. The control supervisory information is multiplexed with the voice information in digital form for transmission to the port group unit connected to the port group highway. Then the corresponding port group unit performs various functions in response to the commands and converts the digital voice data signals into analog form for transmission through a particular port circuit to the subscriber's telephone lines.

Digital central offices of this type require individual telephone lines from each subscriber location to the location of the digital central office. This approach works well and is economical where the subscribers either are located in a relatively small geographical area around the central office, or are randomly, but widely, dispersed geographically centered around the digital office. However, it often occurs that telephone subscribers are located in clusters geographically remote from the central office. For example, subscribers may live in small towns, in a rural setting, or in apartment houses, in an urban setting.

In such situations, in the system of application Ser. No. 507,935, a line must be strung from the central office to each remote subscriber's location. This line may include not only cabling, but also gain devices such as amplifiers, for each subscriber line. The expense of the additional cabling is readily apparent, especially in view of the fact that in many such situations the traffic volume in such remote networks, as a percentage of maximum traffic capacity, is very low. Thus, the actual utilization of the telephone lines can become quite expensive and inefficient.

One approach as disclosed in U.S. Pat. No. 4,393,495, is to place remote port units at the center of subscriber clusters and establish a reduced number of communications links between the clusters and the central office. One problem with such an arrangement is that, as traffic increases, the number of lines between the remote port unit and the central office remains fixed. Therefore, as traffic increases, additional remote port units must be established to carry the additional traffic.

The arrangement of U.S. Pat. No. 4,393,495 allows signals from a specified group of telephone subscriber lines to be multiplexed onto a particular span to the central office. When the span's traffic carrying capacity is full, no more calls can be accepted from that group of subscriber lines, even if additional spans may be available to that same geographical area of subscribers through other remote ports. The additional spans are connected only to other subscriber lines through the other ports, which substantially reduces the traffic-carrying flexibility of the system.

SUMMARY

It is therefore an object of the invention to provide a new and improved port unit for connecting a plurality of telephone lines to a central office through highways the number of which may be varied to allow for increasing or decreasing traffic capacity.

It is a further object of the invention to provide a new and improved port unit in which a plurality of telephone subscriber lines may each be connected to a central office through one or more port group highways in a relationship that is not fixed between the subscriber lines and port group highways.

In accordance with this invention, one or more line switches is connected to a central office through an interface that connects telephone calls over one or more port group highways through a central office time slot interchange matrix network switch. The interface also transfers sense and control supervisory information between a line switch controller located on each line switch and the central office's call control processor. The line switch may be colocated with the central office, or it may be remotely located in and among a cluster of subscribers. Each line switch connects to a plurality of subscriber's lines. Each call from a subscriber's line may be allocated to a time slot channel on any one of several port group highways for transfer to the matrix switch network. The line switch controller selects the time slot channel and the port group highway and transfers that information to the call control processor to enable it to control the time slot interchange to insure that the call is correctly routed.

This invention, therefore, provides a simple arrangement in which a call from any subscriber's line may be coupled onto any time slot channel on any port group highway connecting the line switch with the central office. If it is initially determined that fewer than a predetermined number of port group highways are required for a particular line switch, because of telephone traffic conditions, the unneeded port group highways need not be provided, thus saving cabling and associated costs. Additionally, as traffic increases, the additional highways between the line switch and central office may be added, up to the predetermined maximum number for which the system is designed, and time slots channels on those highways be made available to all subscribers connected to the line switch. Thus, the basic architecture of the line switch need not be changed for additional port group highways added.

BRIEF DESCRIPTION OF THE DRAWINGS

This invention is pointed out with particularity in the appended claims. The above and further objects and advantages of this invention may be better understood by referring to the following detailed description, taken in conjunction with the accompanyng drawings, in which:

FIGS. 2A-1 and 2A-2, is a detailed block diagram of the line group highway switch used in the telephony network shown in FIG. 1.

FIG. 4 is a flow diagram describing the transfer of information signals between the line switch controller of FIG. 3 and the line group highway switch of FIG. 2A;

DESCRIPTION OF AN ILLUSTRATIVE EMBODIMENT

A. Telephony Network

Figure 1A:
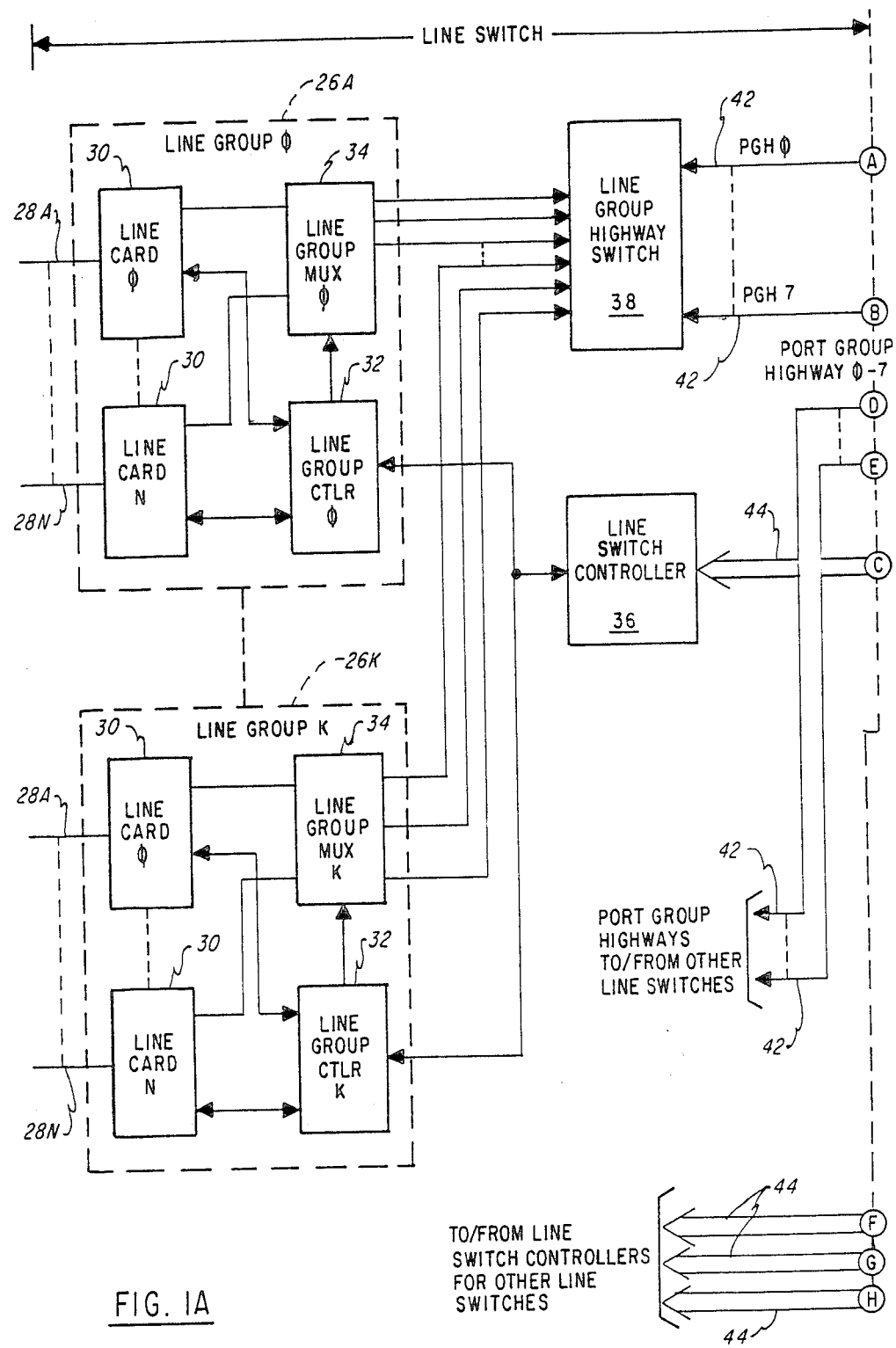
FIGS. 1A and 1B, is a block diagram of a telephony network constructed in accordance with this invention.
Figure 1B:
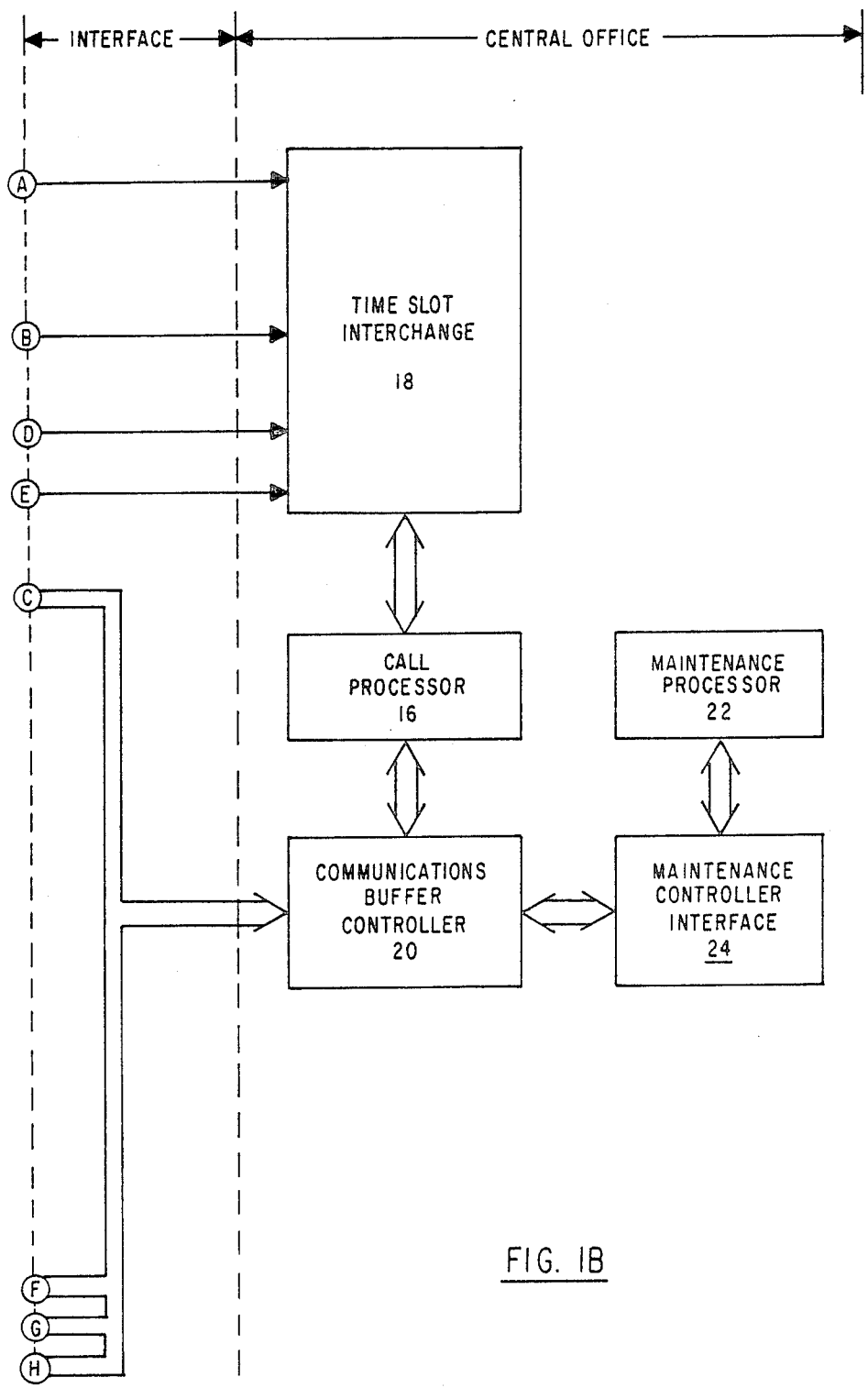
Figures 1, 2A:
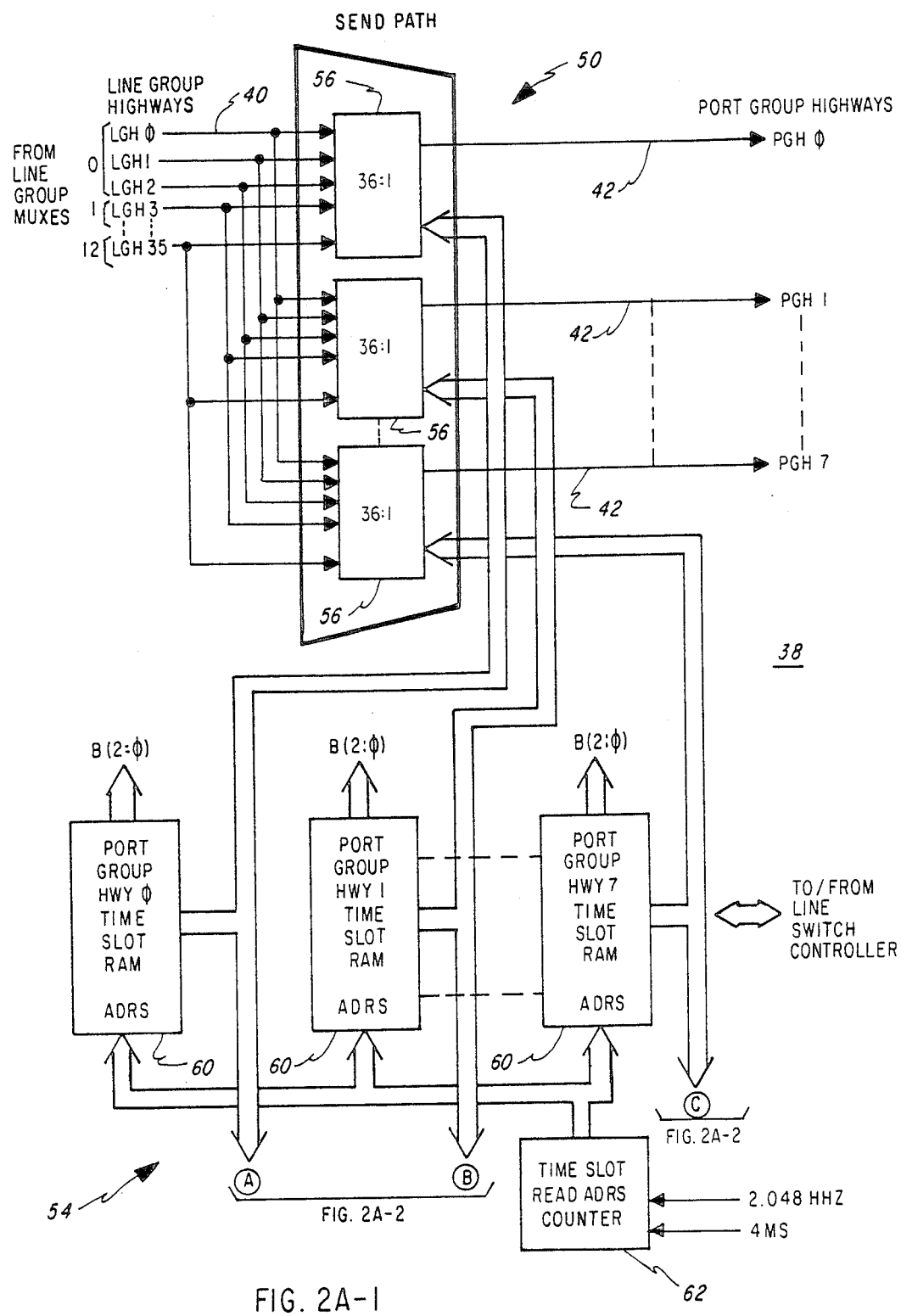
FIG. 1, comprising
FIG. 2A, comprising
Figures 2, 2A:
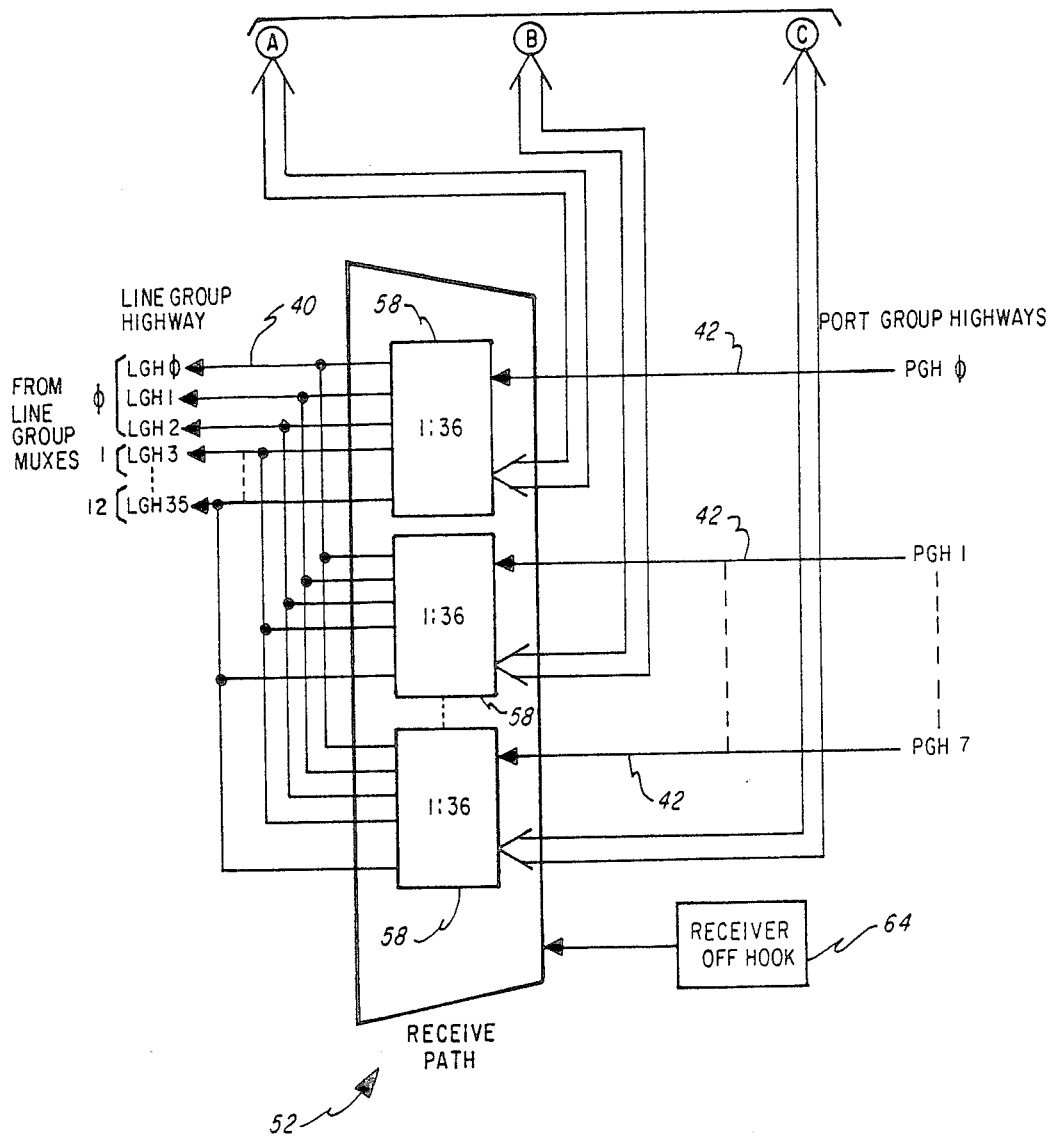

FIG. 1 depicts a telephony system that includes a central office 10 connected to a line switch 12 through an interface 14. The central office 10 may be as depicted in U.S. patent application Ser. No. 507,935, filed June 23, 1983, and U.S. Pat. No. 4,393,495. A call control processor 16 controls the call processing operations of the system. A time slot interchange matrix switch network 18, under control of call control processor 16 performs line and trunk switching operations through central office 10. The call control processor 16 also transmits and receives control and sense supervisory information with the rest of the system through, for example, a communications buffer controller 20.

As is common in telephony systems, certain elements of the system may be duplicated or redundant so that if one element fails, the redundant element may take over. A maintenance processor 22, which connects to the rest of the central office through a maintenance communications interface 24, performs maintenance and diagnostic operations on the system and detects when one of the elements fails. The maintenance processor can cause the redundant element to substitute for a failed element, in some instances may take certain corrective action, and will also provide certain diagnostic information to a maintenance repairman.

The line switch 12 includes a plurality of line groups 26A through 26K, each of which connects to a plurality of subscriber lines 28A through 28N. Each line group 26a–26k may connect to a selected number of subscriber lines 28a–28n. In one specific embodiment, a maximum of ninety subscriber lines may be connected to one line group, and a maximum of twelve line groups can be connected in one line switch 12. Each subscriber line is connected to a line card 30 which converts the analog voice signal to a digital pulse code modulated (PCM) signal for transmission to the rest of the telephony system, and converts the digital PCM signal received from the telephony system into an analog signal for transmission to the subscriber line. Line card 30 also detects when a subscriber's receiver goes on and off hook, and sends signals representative of these events to a line group controller 32. The digitized voice information is transferred directly to and from a line group multiplexer 34, which is under control of the line group controller 32.

The line group controller transfers messages to a line switch controller 36 informing it of the on- and off-hook condition of the lines, and receives messages from the line switch controller 36 which, for example, cause the line group multiplexer 34 to establish or eliminate paths for lines that have gone off- or on-hook. The line switch controller 36 also generates and transmits messages to the call control processor 16 in central office 10 over interface 14 and through communications buffer controller 20, in response to the messages from the line group controllers 32. The line switch controller 36 also receives messages from the call control processor 16 over interface 14, and through communications buffer controller 20, and in turn may generate other messages in response thereto for transmission to the line group controllers 32 to cause certain actions, such as ringing, to occur on the subscriber lines.

In addition, the line switch controller 36 controls a line group highway switch 38 which receives the digitized voice information signals in specified time slot channels from the line group multiplexers 34, specifically from line group highways 40 connected to the line group multiplexers, and transfers them over a "send" path to specified port group highways 40 for transfer to the time slot interchange matrix switch network 18 at the central office 10. The line group highway switch 38 also receives the digitized voice information signals from the time slot interchange matrix switch network 18, specifically from port group highways 42, and distributes them over a "receive" path to the respective line group multiplexers 34 over line group highways 40.

Central office 10 may be connected to a plurality of line switches 12 through interface 14. The interface includes one or more port group highways which transfer the digitized voice information signals to and from the line group highway switch in each line switch. The connection of each port group highway to the central office 10 is described in the above-referenced U.S. patent application Ser. No. 507,935 and U.S. Pat. No. 4,393,495. In addition, the interface 14 includes a control path 44 over which the line switch controller 36 in the line switch communicates with the call control processor 16 and the maintenance processor 22, by way of communications buffer controller 20 and, in the instance of maintenance processor 22, maintenance communications interface 24, all in the central office 10. The actual manner in which the communication signals are transferred over control path 44 is not an element of this invention, and will not be described in detail. In one specific embodiment, the control path makes use of a SDLC (synchronous data loop controller) protocol which is well known in the art. In that embodiment, the call control processor 16 and maintenance communication interface 24 send messages to the communications buffer controller 20, which acts as a loop master, with the line switch controllers in the various connected line switches being slave units in the loop. The communications buffer controller formulates the messages into the SDLC protocol for transmission to the line switch controllers, and receives messages from the line switch controllers in response to loop polls. In that same embodiment, the line group controllers 32 in each line switch 12 are SDLC (synchronous data link controller) slaves in a loop controlled by the line switch controller 36.

A line switch may be co-located with the central office, or it may be remote from the central office. For the line switches that are remote from the central office, the port group highways 42 may be constituted by conventional T1 spans, in which supervisory information is multiplexed with the digitized voice information and transferred over the same lines. The SDLC (synchronous data link controller) signals are also multiplexed onto the T1 spans in selected channels of the T1 spans that have heretofore normally been allocated to digitized voice information signals.

In one specific embodiment, each line group 26a–26k is connected to three line group highways 40; therefore, line group highway switch 38 is connected to a maximum of thirty-six line group highways. A maximum of eight port group highways 42 connects the line switch 12 to central office 10. Each line group highway and each port group highway carries thirty-two time slot channels, with thirty channels transferring digital voice information signals and the other two channels transferring port control information signals. For the line switches 12 remote from the central office, in which the port group highways are constituted by T1 spans, twenty-four time slot channels are available, which transfer either digitized voice information signals, with A and B supervisory bits transferring supervisory information, or messages as described above. Since the T1 spans are limited to twenty-four channels, the line group highways in the line switches connected to the T1 spans are also limited to using twenty-four time slot channels each.

B. Line Group Highway Switch

FIG. 2A depicts a block diagram of a line group highway switch according to the invention. In one specific embodiment of the invention, the line group highway switch 38 in a "send" path transfers digitized voice information signals from one of thirty channels in any of thirty-six line group highways 40 onto the same time slot channel on one of a maximum of eight port group highways 42, for transfer to the time slot interchange matrix switch network 18 at the central office 10 (FIG. 1). Similarly, in a "receive" path, the line group highway switch 38 transfers digitized voice information signals from a time slot channel on any of a maximum of eight port group highways 42 to the corresponding time slot channel on any of the line group highways 40 for transfer to a subscriber line 28a–28n. (As noted above, however, where the port group highways are constituted by T1 spans, the number of time slot channels available on the line group highways on both the send and receive paths is reduced to twenty-four, and may be further reduced if any of the T1 time slot channels are allocated to the transfer of messages between the line switch controller 36 and central office 10.) Thus, each subscriber line connected to a line switch has all of the time slot channels on the port group highways connecting the line switch 12 to the central office 10 available to it. Further, the line switch may be initially installed in the system with fewer than the maximum number of port group highways connected, thus reducing the initial installed system cost, and more port group highways may be readily installed later as traffic increases.

As shown in FIG. 2A, line group highway switch 38 includes a send path 50, a receive path 52 and a control network 54. The send path includes eight thirty-channel group selectors 56 each of which transfers digitized voice information signals from time slot channels on the line group highways connected thereto, onto the same time slot channel on a port group highway PGH0 through PGH7 42 for transfer to the time slot interchange matrix switch network 18.

Similarly, the receive path 52 includes eight thirty-channel group selectors 58, each of which transfer the incoming digitized voice information signals from its connected port group highway PGH0 through PGH7 42 and transfers it onto any of the line group highways 40 for transfer to a corresponding line group multiplexer 34.

Control network 54 determines the line group highway to receive and transmit the digitized voice information signals from or to a port group highway in each time slot channel. Control network 54 includes eight port group highway (PGH) time slot random access memories (RAM's) 60, with each PGH time slot RAM being connected to address a receive selector 58 and send selector 56. The PGH time slot RAM's 60 identify, for each port group highway PGH0 through PGH7 and each time slot channel CH0 through CH29, the line group highway LGH0 through LGH36 to receive or transmit the digitized voice information signals. The PGH time slot RAM's 60 are, in turn, addressed by the time slot read address counter 62, which receives 2.048 MHz and 4 Ms timing signals from the central office by way of the port group highway 42. These timing signals synchronize the counter to the signals over the port group highway 42 and identify transitions between time slot channels. The time slot read address counter 62 identifies the channel then being transmitted and received over the port group highways PGH0–PGH7 42. Each PGH time slot RAM identifies the line group highway LGH0–LGH36 whose digitized voice information signal is to be coupled through the connected selectors 56 and 58 during the time slot identified by the time slot read address counter 62.

In addition to transferring digitized voice information signals between particular channels on the line group highways 40 and port group highways 42, the line group highway switch 38 may also transfer selected tone signals generated by the line switch 12 to a particular line group highway and from there to a particular subscriber line. An example of this is a digital receiver off hook (ROH) signal generated by an ROH signal generator 64. The ROH signal from ROH signal generator 64 can be applied through any of the receive path selectors 58 for transfer onto selected channels of line group highways LGH0–LGH35 40. When the PGH time slot RAM's 60 identify the line group highway, they also indicate, by way of a function code B(2:0), an operation or function to be performed. This can cause the signal from the port group highway to be coupled onto the line group highway in that time slot channel, or it may cause the associated receive selector 58 to connect the ROH signal from ROH signal generator 64 to the time slot channel on the identified line group highway.

Figure 2B:
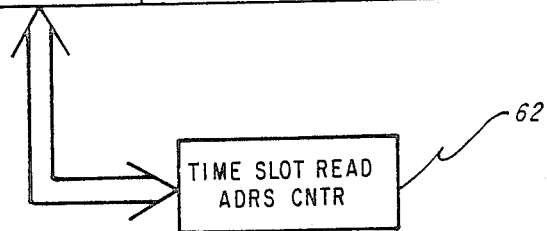
FIG. 2B is a memory map useful in understanding FIG. 2A.

In one specific embodiment, each PGH time slot RAM 60 includes thirty nine-bit words, six bits identifying the line group highway and three bits constituting the B(2:0) function bits. A detail of the data structure contained in a port group highway PGH0 time slot RAM 60 is shown in FIG. 2B. As depicted therein, for each time slot channel CH0 through CH29 there is a function code $B_0(2:0)$ through $B_{29}(2:0)$ and a line group highway number $LGH_0$ through $LGH_{29}$. The time slot read address counter 62 sequentially addresses the time slot channels to identify the channel then being transferred over the port group highway. The line group highway number and the associated function code and are read out of the PGH time slot RAM and coupled to the connected selectors 56 and 58. The line group highway number is used to address the selectors 56 and 58, while the function code indicates the operation to be performed, such as to couple digitized voice information signals between the identified line group highway and the port group highway, or to connect a tone such as a receive off hook from receiver off hook generator 64 onto the identified line group highway during that time slot channel.

As has been indicated, all of the thirty-six line group highways LGH0–LGH35 40 from all of the line groups and subscriber lines connected to the particular line switch are connected to all of the selectors 56 and 58. Therefore, the digitized voice information signals from any subscriber line may be transferred over any of the maximum of eight port group highway PGH0–PGH7 42 that may be connected to the line switch 12, unlike the prior art in which particular line group highways were associated with a particular port group highway in a fixed relationship. This new arrangement provides redundancy on the port group highways, for if one port group highway has failed, the line switch controller can route calls over the remaining port group highways, although on a somewhat lower traffic capacity. Furthermore, when the telephony system is initially installed, fewer than the maximum eight port group highways may be provided, thereby reducing the installed system costs until the telephone traffic warrants expansion. Furthermore, all that need be done to expand the traffic capacity of the system is for additional port group highways to be connected between the central office 10 and the line switch 12 and the line switch controller 36 notified of the change, which would be merely a software data change; at most only minor changes would be required to the hardware of either the line switch or the central office.

C. Line Switch Controller 36

As has been mentioned, line switch controller 36, selects the line group highway LGH0 through LGH35 40, port group highway PGH0–PGH7 42 and time slot channel CH0 through CH29 over which the digitized voice information signals are to be transferred. Line switch controller 36 then informs the call control processor 16 of the port group highway and time slot channel assigned to the calling telephone, and also identifies the calling telephone. If the line switch controller is associated with the line switch of the called telephone, it receives a message from the call control processor 16 identifying the called telephone, and selects the port group highway, time slot and line group highway to transfer the digitized voice information between the central office 10 and the called telephone line. In each case, the line switch controller sets up the paths through the line group highway switch 38 and causes the line group controllers 32 to establish paths through the line group multiplexers 34.

Figure 3:
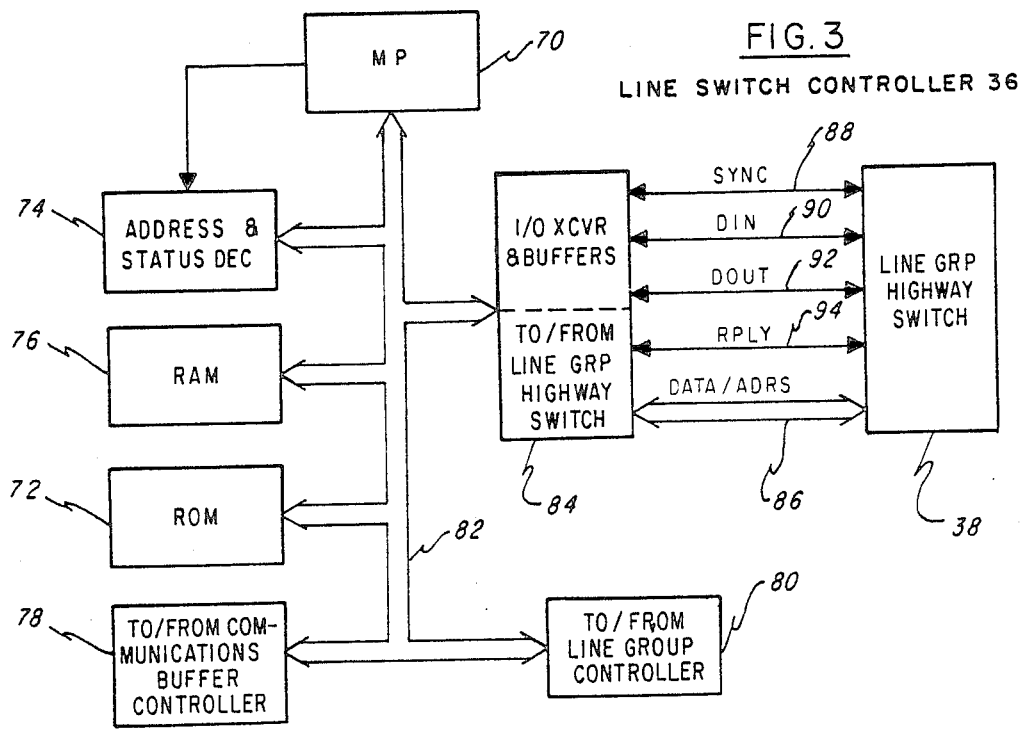
FIG. 3 is a block diagram of the line switch controller of the telephony network shown in FIG. 1.

FIG. 3 depicts, in block diagram form, a line switch controller 36 for the telephony system of FIG. 1. The line switch controller is controlled by a microprocessor 70, that processes programs stored in a read only memory (ROM) 72 and a random access memory (RAM) 76. Microprocessor 70 operates in conjunction with an address and status decoder 74 and the random access memory 76 that stores data structures used in executing the programs stored in ROM 72 and RAM 76. The line switch controller also includes an interface circuit 78 to the communications buffer controller 20 (FIG. 1) in central office 10 and an interface circuit 80 through which the line switch controller transmits messages to and receives messages from the line group controllers 32. The various elements of the line switch controller are interconnected by a common bus 82.

In addition to interface buffers 78 and 80, line switch controller 36 also includes an interface transceiver and buffer 84 through which it communicates with line group highway switch 38.

D. Operation of Line Switch Controller 36 and Line Group Highway Switch 38

1. Information Transfers Between Line Switch Controller and Line Group Highway Switch As has been mentioned, the line switch controller 36 loads the line group highway switch 36 PGH time slot RAM's 60 (FIG. 2A) with the line group highway LGH0 through LGH7 to be associated with a time slot channel CH0 through CH29 and port group highway PGH0 through PGH7. All information between the line switch controller 36 and line group highway switch 38 is transferred between interface transceiver and buffer 84 and the line group highway switch 38 over a bus which includes a number of lines, shown in FIG. 3, using a sequence described in the flow diagram of FIG. 4. Data signals and address signals are multiplexed onto DATA/ADRS (data/address) lines 86. The line switch controller transmits a SYNC (synchronization) signal over line 88 to begin a transfer and indicate that it is transmitting an address over DATA/ADRS lines 86 (steps 102 and 104, FIG. 4). After an interval in which the address is received by the line group highway switch 38, interface transceiver and buffer 84 determines whether information is to be transferred to the line group highway switch in a WRITE operation or from the line group highway switch in a READ operation (step 106). The transceiver and buffer 84 removes the address from lines 86 (step 108) and energizes a DIN data in line 90 if the operation is a READ operation. If the DIN data in line is energized, the line group highway switch transmits data over DATA/ADRS lines 86 (step 110) and energizes the RPLY reply line 94 (step 112). The interface transceiver and buffer 84 then strobes the data signals (step 114) when it de-energizes the DIN data in line 90. The line group highway switch then de-energizes the RPLY reply line 94.

If the operation is a write operation, in which data is transferred from the interface transceiver and buffer 84 to line group highway switch 38, buffer 84 places the data on DATA/ADRS lines 86, and energizes DOUT data out line 92 (step 116). Line group highway switch 38 then raises the RPLY reply line 94 (step 118). The line group highway switch 38 then strobes the data on the DATA/ADRS lines 86, when it de-energizes the RPLY reply line 94. When the I/O transceiver and buffer 84 senses the negation of the RPLY reply signal on RPLY reply line 94, it in turn de-energizes the DOUT data out line 92 to complete the transfer (step 120).

As has been mentioned above, the line switch controller 36 loads the PGH time slot RAMs 60 (FIGS. 2A and 2B) with a function code B(2:0) and line group highway number. The line switch controller 36 performs this operation by using three registers addressable by microprocessor 70 (FIG. 3), a data register 1 (FIG. 5A), a data register 2 (FIG. 5B), a command register (FIG. 5C). The data register 1 includes fields in which microprocessor 70 stores a port group highway number 0 through 7 and a time slot channel number 0 through 29. The data register 2 includes a field in which microprocessor 70 stores a line group highway number 0 through 35. The command register includes fields for an operation code SOC(4:0), which initiates a command such as a read or write operation, and the function code B(2:0).

Figure 5A:
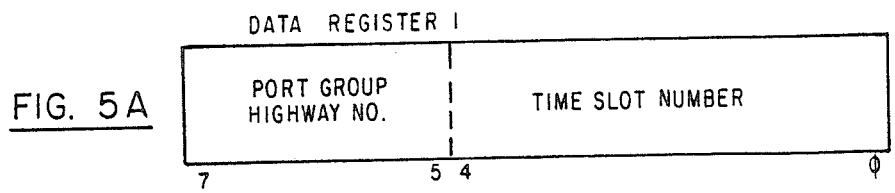
FIGS. 5A through 5D depict certain registers comprising the interface between the line switch controller depicted in FIG. 3 and the line group highway switch depicted in FIG. 2A.
Figure 5B:
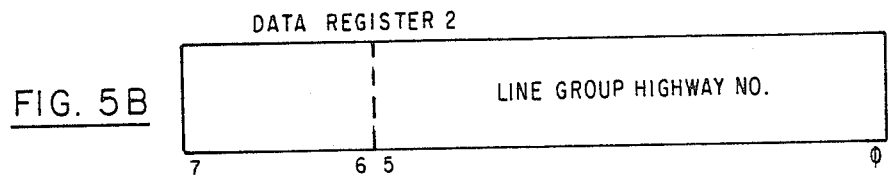
Figure 5C:
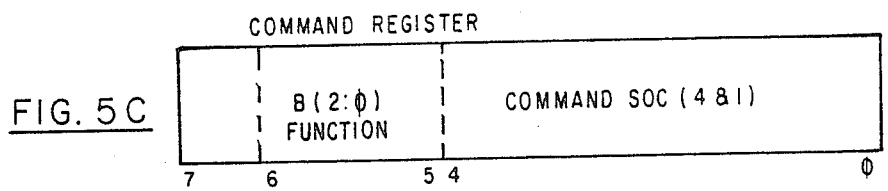

Using the three registers set forth in FIGS. 5A through 5C, the line switch controller loads a function code B(2:0) and associated line group highway number LGH0-LGH35 into the time slot channel location in the PGH time slot RAM identified in data register 1 (FIG. 5A). The contents of the data register 1 (FIG. 5A) constitute an address identifying the PGH time slot RAM 60, and time slot channel CH0 through CH29 to receive the line group highway number LGH0 through LGH35 stored in data register 2 (FIG. 5B) and function code B(2:0) stored in the command register (FIG. 5C). The operation code command register field SOC(4:1) loaded by microprocessor 70 initiates the interface transceiver and buffer 84 loading of the line group highway number and function code into the identified time slot channel location of the indicated PGH time slot RAM 60, using the sequence described in FIG. 4.

Figure 5D:
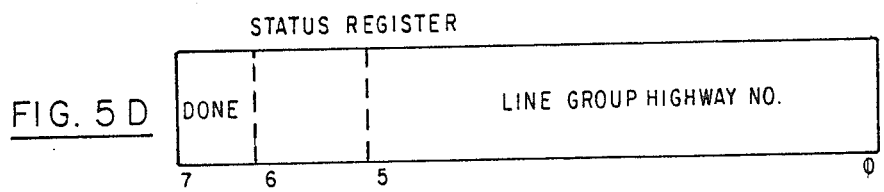

If the operation code field SOC(4:1) of the command register (FIG. 5C) is a READ operation, the line group highway number LGH0 through LGH35 associated with the port group highway and time slot channel number is received by line switch controller microprocessor 70 as status register information (FIG. 5D). Additionally, a DONE bit is returned in the status register to indicate whether the operation specified in the operation command field SOC(4:1) in the command register (FIG. 5C) has been completed by the line group highway switch 38.

2. Path Selection

The line switch controller 36 determines a path for transferring the digitized voice information between the subscriber line 28a-28n (FIG. 1), and central office 10 over a port group highway, a line group highway, and a time slot through the line group highway switch 38.

Figure 6:
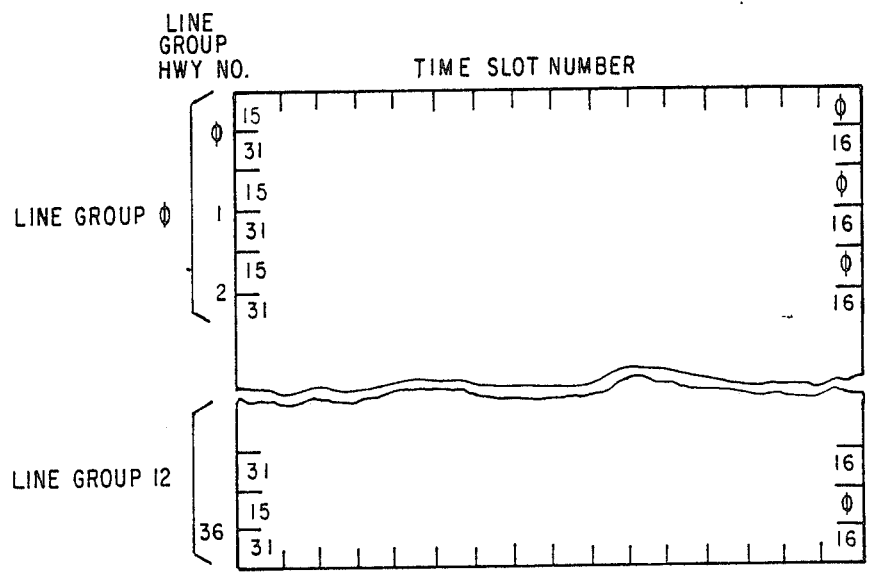
FIGS. 6, 7 and 8 are memory maps detailing data structures used by the line switch controller of FIG. 3 in controlling the line group highway switch of FIG. 2A.
Figure 7:
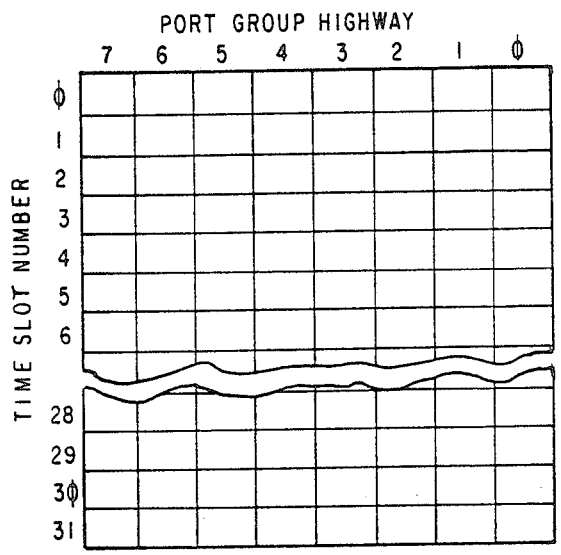
Figure 8:
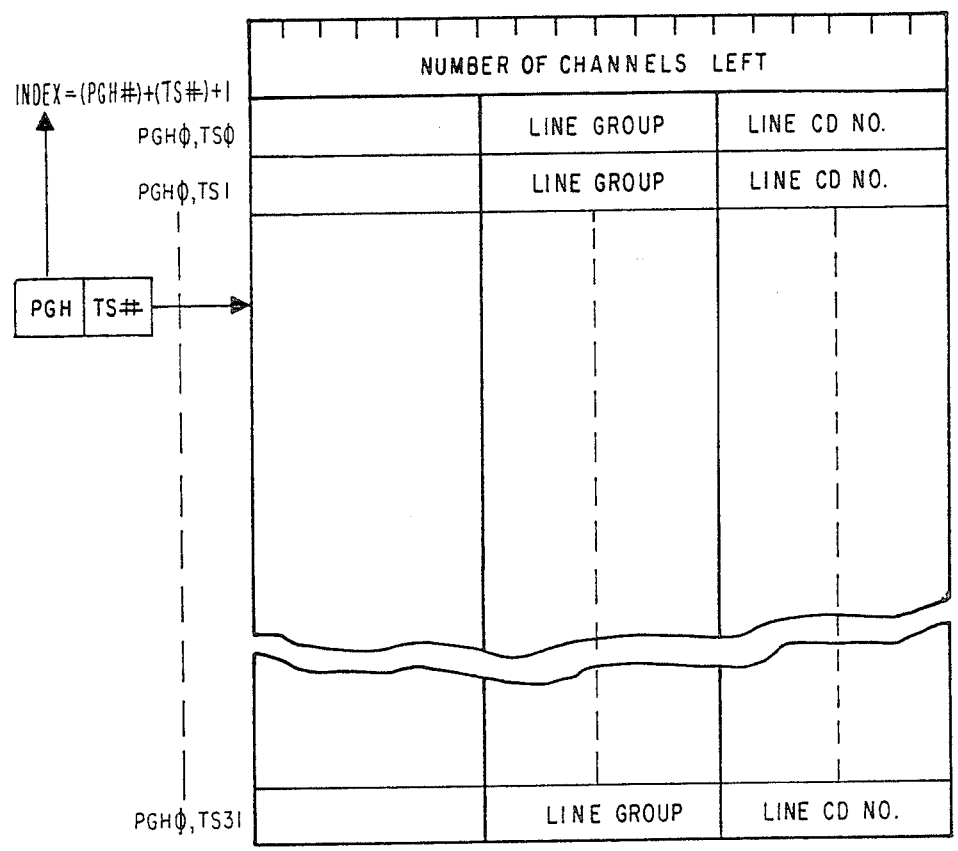

In doing so, the line switch controller uses three tables stored in RAM 76 (FIG. 3) shown in FIGS. 6, 7 and 8. FIG. 6 depicts a line group highway busy/idle map in which the busy or idle status of each of the thirty time slot channels CH0 through CH29 that carry the voice signals on each of the thirty-six line group highways LGH0 through LGH35 is represented by a bit. In the table depicted in FIG. 6, thirty-two time slot channels can be accommodated; however, in one specific embodiment only thirty channels may be used for voice transmission, and two channels are reserved for transfer of certain control information. Each horizontal line of the line group highway busy/idle map depicted in FIG. 6 is a sixteen-bit data word separately addressable and retrievable by microprocessor 70 (FIG. 3). Therefore, the microprocessor 70, by retrieving one word of the line group highway busy/idle map, can determine the busy or idle status of time slot channels CH0 through CH15 or CH16 through CH31 of a line group highway.

The second table used by line switch controller 36 in path selection is a PGH (port group highway) busy/idle map depicted in FIG. 7. The PGH busy/idle map is maintained by the line switch controller to indicate, for each time slot channel, the busy or idle status of each port group highway connected to between the line switch 12 and central office 10. As depicted in FIG. 7, each horizontal line is associated with a particular time slot 0 through 31, while each vertical column is associated with a port group highway. Each horizontal line is an eight-bit data byte separately addressable by microprocessor 70. Thus, the bits in each row depict the busy or idle status of one time slot channel on all of the port group highways PGH7 through PGH0. Those bits of the PGH busy/idle map for which there are no port group highways connected may be masked or they may be automatically set by the microprocessor to indicate a busy or unavailable status, or they may be ignored in path selection.

FIG. 8 depicts the third table maintained by the line switch controller to select voice paths through the line group highway switch 38. FIG. 8 depicts a voice path assignment table, which indicates the number of time slot channels remaining on the port group highways connecting the line switch to the central office, and the line group number and line card number of lines that are then associated with each port group highway and time slot channel. The table as depicted in FIG. 8 is word (that is, two byte or sixteen bit) addressable by microprocessor 70, that is, each horizontal line contains a word that may be separately addressed and retrieved by microprocessor 70. The first addressable storage location of the table contains the number of time slot channels that have not been assigned. The second through 257th locations identify the line group number and the line card number of the subscriber line associated with each port group highway and time slot channel.

Figure 9A:
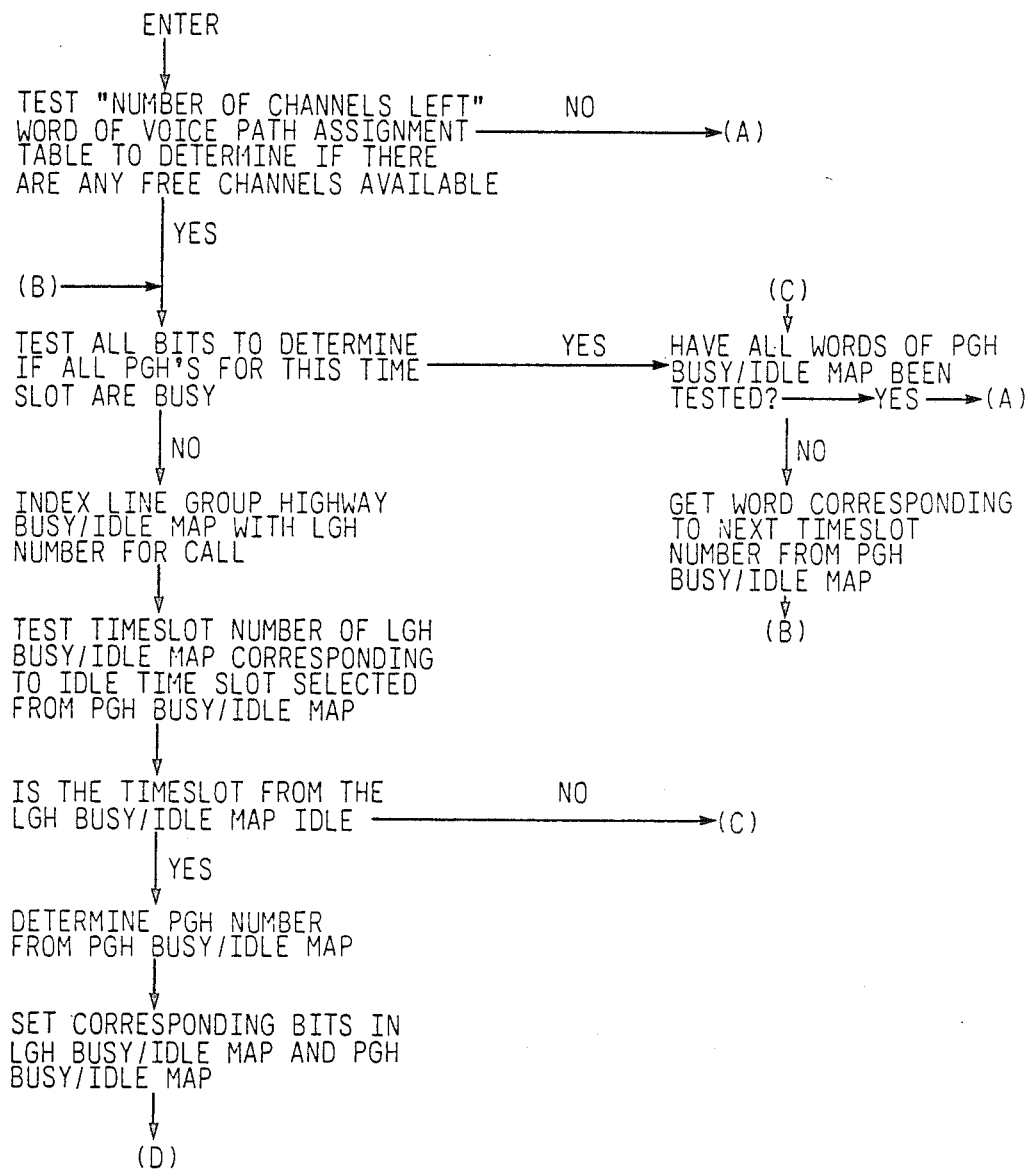
FIGS. 9A and 9B contain a flow diagram describing operations performed by the line switch controller of FIG. 3 in selecting voice paths through the line group highway switch of FIG. 2A, and using the data structures of FIGS. 6 through 8.
Figure 9B:
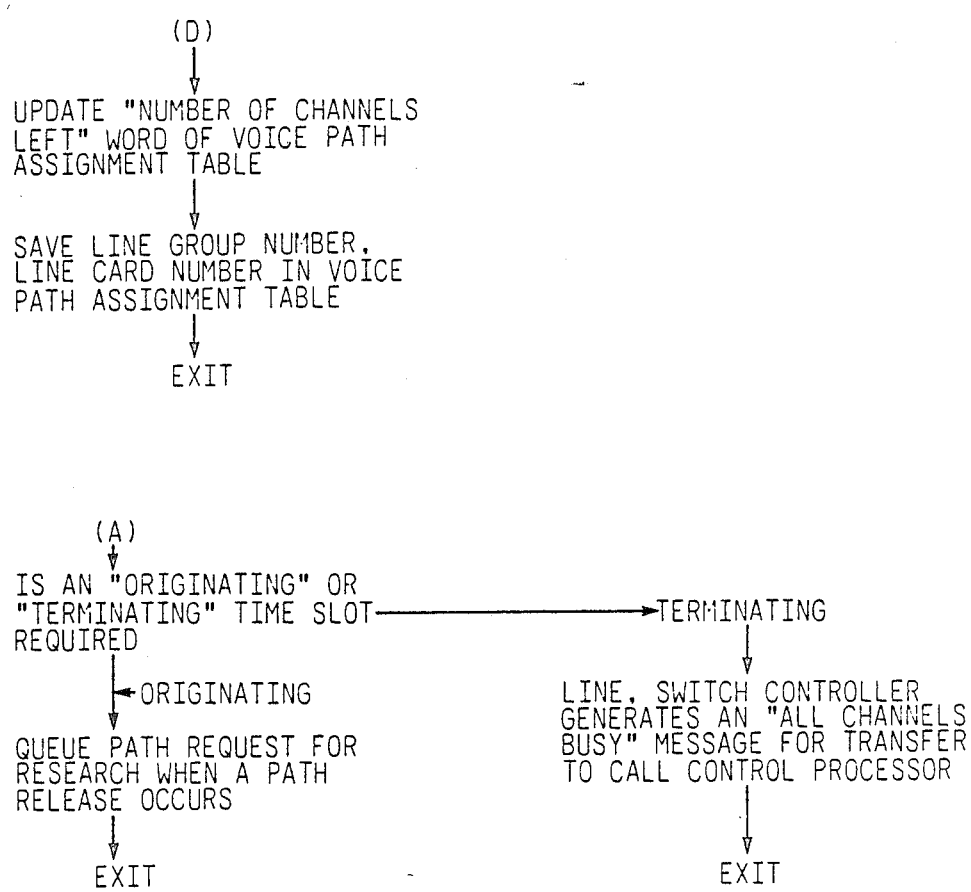

The operations performed by the line switch controller in selecting a port group highway, time slot channel, and line group highway are set forth in flow-diagram form in FIGS. 9A and 9B. The line switch controller first tests the "number of channels left" word of the voice path assignment table (FIG. 8) to determine if any idle channels are available (step 200). If an idle channel is available, the line switch controller retrieves the a word of the PGH busy/idle map (FIG. 7), the bits of which indicate the busy/idle status of time slot channel CH0 on each port group highway (step 202). The line switch controller then tests the individual bits of the word to determine whether all port group highways for this time slot channel are busy (step 204). If they are busy, the line switch controller determines whether all of the time slot channel words of the port group highway busy/idle map have been tested (step 206) and, if not, retrieves the word from the PGH busy/idle map corresponding to the next time slot channel number (step 208). At this point, the line switch controller returns to step 204 to test the bits to determine the busy or idle status of this time slot channel on each port group highway.

When the line switch controller determines that a time slot channel on a port group highway is idle, that is, when it locates a bit in the PGH busy/idle map that is clear, the line switch controller cycles to step 210. In this step, the line switch controller determines the line group highway that is connected to the line group to which the originating or terminating subscriber line is connected. The line switch controller then retrieves the word from the line group highway busy/idle map (FIG. 6) containing the time slot channel for that line group highway. For example, if a subscriber line connected to line group 0 (26A on FIG. 1) is an originating or terminating line, and the line switch controller has initially identified time slot channel 0 as being idle, the line switch controller will retrieve the first word of the line group highway busy/idle map (FIG. 6) to test the 0th bit for its busy or idle status (step 212). Alternatively, if the line switch controller has initially identified time slot channel 16 as being idle, it will (in step 212) retrieve the second word of the line group highway busy/idle map (FIG. 6) to test the busy and idle status of the bit corresponding to that time slot channel.

The line switch controller 36 tests the word of the line group highway busy/idle map containing the bit corresponding to the time slot identified as being idle from the PGH busy/idle map for an idle coincident time slot channel. If the time slot channel on the line group highway is busy, the line switch controller then returns to step 206 to attempt to locate another idle port group highway time slot channel (step 214), and then re-examine if the line group highway has that channel idle.

When line switch controller 36 locates a port group highway, and idle line group highway having the same idle time slot channel, it then determines the port group highway number, line group highway number, and time slot channel number and then stores the numbers in memory and in the appropriate PGH time slot RAM 60 (FIG. 2A, step 216), and then sets the corresponding bits in the line group highway busy/idle map and port group highway busy/idle map (step 218). The line switch controller then updates the "number of channels left" word of the voice path assignment table (FIG. 8, step 220), and saves the line group number and line card number of the subscriber line in the voice path assignment table (FIG. 8) in the location corresponding to the selected port group highway and time slot channel number (step 222).

If, in step 200, the line switch controller 36 initially determines that no idle channels are available, or if in step 206, the line switch controller determines that it cannot match a time slot on a port group highway with a corresponding time slot on a line group highway, the line switch controller then cycles to step 224. In step 224, the line switch controller determines whether an "originating" time slot or a "terminating" time slot is required. An originating time slot channel is required if the associated subscriber line is a calling telephone, and a terminating time slot channel is required if the associated subscriber line is a called telephone. If the line switch controller is searching for an originating time slot, and no time slot is available for the subscriber line, it queues the path request for another search when a path release occurs (step 226). If, on the other hand, the line switch controller is searching for a terminating time slot channel, the line switch controller generates an "ALL CHANNELS BUSY" message and transfers it to the call control processor 16 (FIG. 1, step 228).

In the specific embodiment described herein, the line group highway switch 38 couples the digitized voice information signal between corresponding time slot channels on a line group highway LGH0–LGH35 and a port group highway PGH0–PGH7. Other arrangements in which the time slot channels are different between the line group highways and port group highways are also within the scope of the invention. In such arrangements, the selectors 56 and 58 (FIG. 2A) may be replaced by random access memories (RAM's) to store the digitized voice information signals with appropriate time slot channel counters for the line group highways and port group highways alternately causing the voice signals to be written into and read from the RAM's.

3. Line Switch Controller-Line Group Highway Switch Operation

Figure 10A:
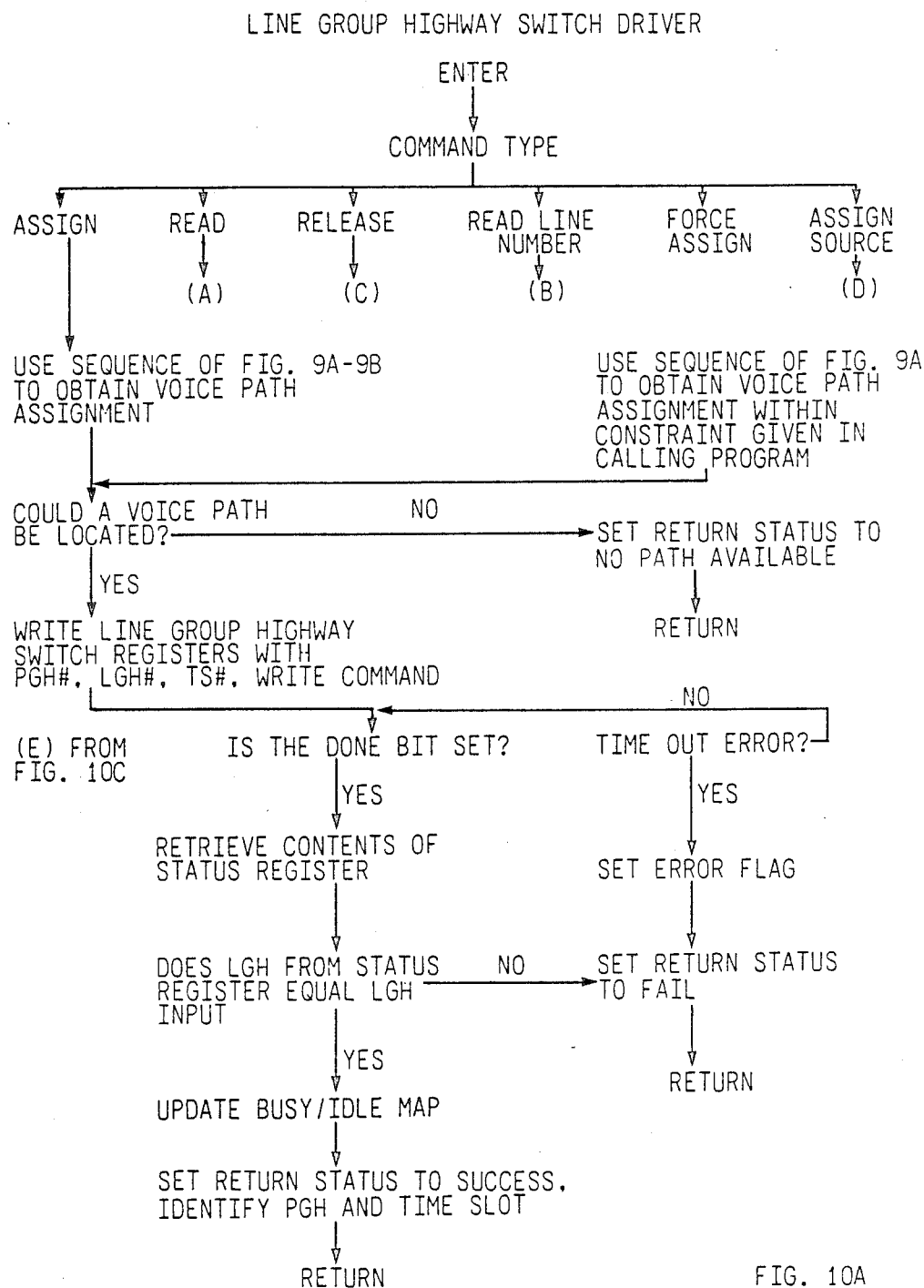
FIGS. 10A through 10C together constitute a flow diagram detailing the steps performed by the line switch controller in controlling the line group highway switch of FIG. 2A.
Figure 10B:
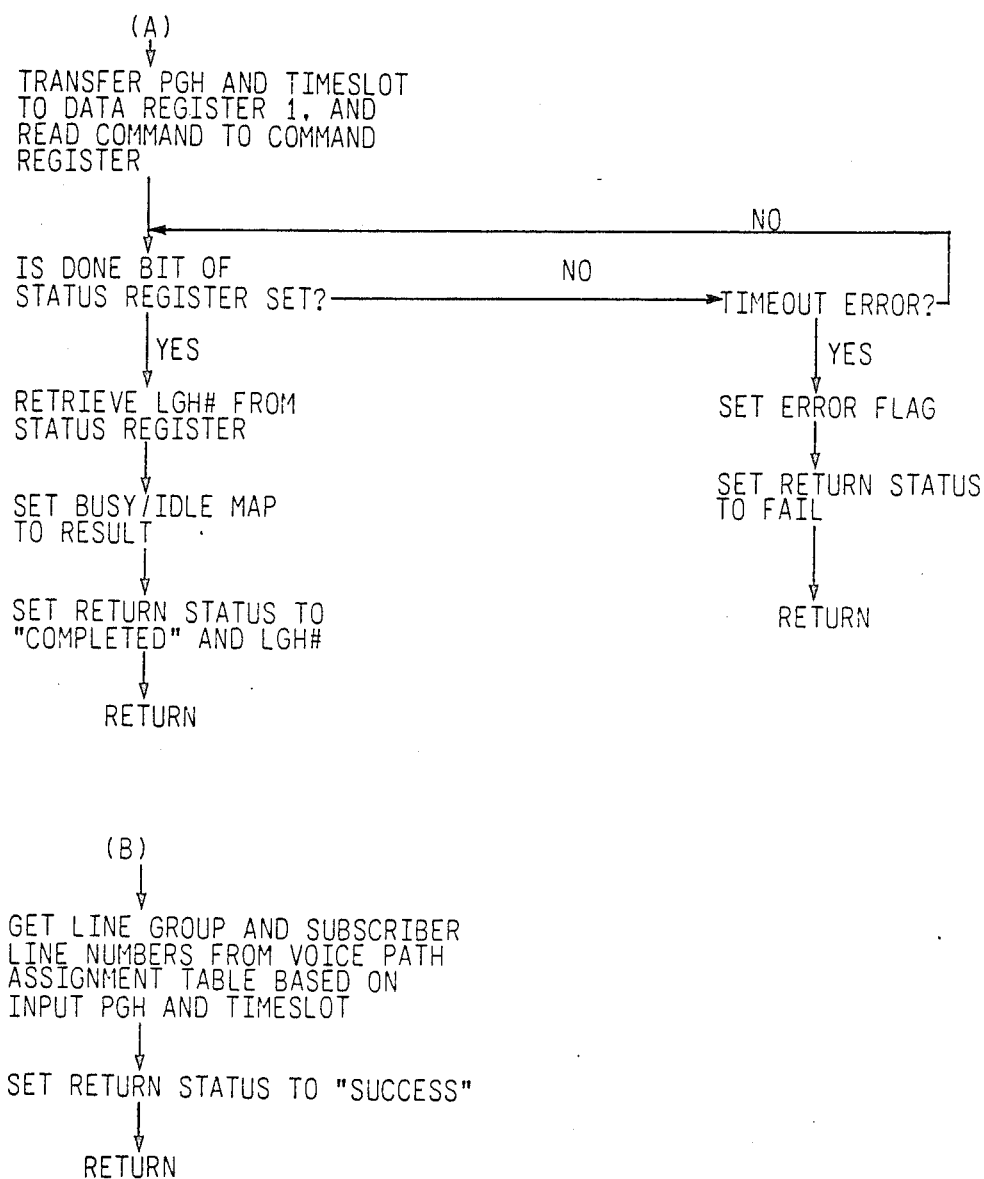
Figure 10C:
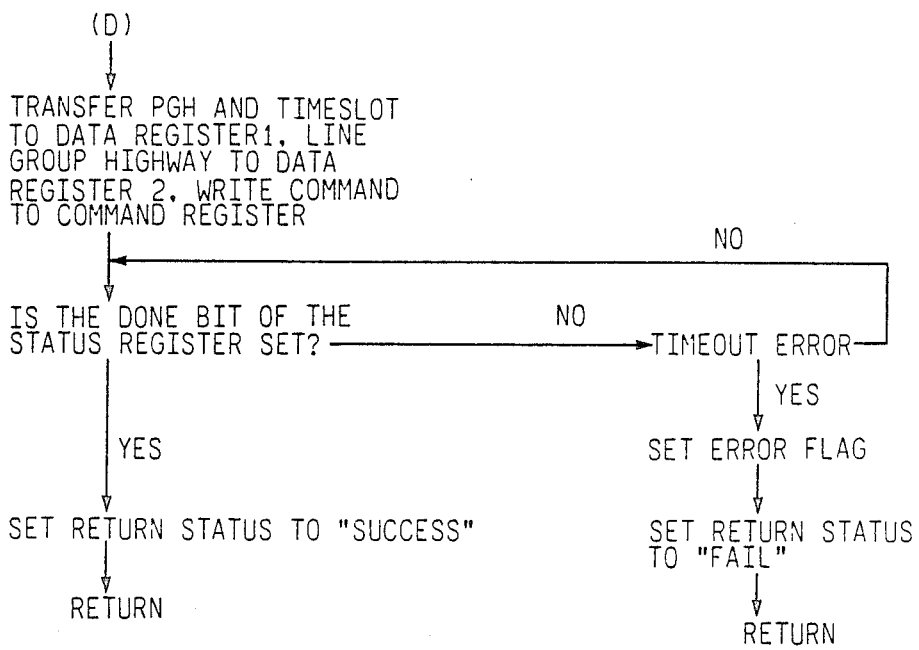

FIGS. 10A through 10C contain flow diagrams which detail the operation of line switch controller 36 with respect to the line group highway switch 38. The line switch controller can perform six types of operations, each initiated by a particular type of command from a calling program executed by the line switch controller.

a. ASSIGN Operation

In an ASSIGN operation, an available time slot channel on a line group highway 40 (FIG. 2A) is matched to an available time slot channel on a port group highway 42 (FIG. 2A), and the line group highway is written into the port group highway time slot RAM 60 (FIG. 2A) addressable storage location identified with that time slot channel.

In performing the ASSIGN operation, the line switch controller first uses the sequence of FIGS. 9A and 9B to obtain a voice path assignment (step 250), that is, to obtain a port group highway, line group highway, and time slot channel for transferring the digitized voice data between the subscriber line 28a–28n (FIG. 1) to the central office 10. If a voice path could not be located (step 252), the line switch controller sets a program return status to "no path available" (step 254) and returns to the calling program.

If, in step 252, a voice path was located, the line switch controller loads the line group highway switch registers (FIGS. 5A through 5C) with the port group highway number, line group highway number, time slot channel number, a function code, and the WRITE command (step 256). The line switch controller monitors the DONE bit of the status register (FIG. 5D, step 258). If the DONE bit of the line group highway switch status register is not set within a specific time-out period (step 260), the line switch controller sets an error flag (step 262) and the program returns status to "fail" (step 264) and returns to the calling program.

If the DONE bit of the line group highway switch status register (FIG. 5D) is set within the specified time-out period, the line switch controller retrieves the contents of the status register (step 266) to verify that the line group highway number was correctly loaded into the addressable storage location of the port group highway time slot RAM (step 268). If it is, then the line group highway and PGH busy/idle maps (FIGS. 6 and 7) are updated (step 270) and the program return status is set to "success" and the port group highway and time slot channel, along with the program return status are returned to the calling program (step 272).

If in step 268 the line group highway number retrieved from the line group highway switch status register is not the same as the line group highway written into data register 2 (FIG. 5B), the line switch controller cycles to step 264 to indicate the FAIL status of the operation before returning to the called program.

b. FORCE ASSIGN Operation

The operations performed by the line switch controller 36 in performing a FORCE ASSIGN operation are identical to the ASSIGN operation, except that the calling program provides certain constraints on the selection of the port group highway, time slot channel, and/or line group highway which are used when locating a voice path through the line group highway switch 38 (step 274).

c. READ Operation

In a READ operation, the line switch controller 36 reads contents of the status register (FIG. 5D).

The sequence used by the line switch controller in executing the read operation is depicted in FIG. 10B. The line switch controller first transfers the port group highway and time slot channel numbers to line group highway switch data register 1 (FIG. 5A) and a READ command to the line group highway switch command register (FIG. 5C, step 280). The line switch controller then monitors the DONE bit of the status register (FIG. 5B) until it is set (step 282) or a time out error occurs (step 284). If a time out error occurs, that is, if the DONE bit is not set within a specified time period, an error flag is set (step 286), and the program return status is set to "fail" (step 288).

If the DONE bit of the status register is set within the time out period, the line switch controller retrieves the line group highway number from the status register (step 290) and the line group highway busy/idle map bit associated with the line group highway and time slot channel is set to indicate the busy status (step 292). The line switch controller sets the program return status to "completed" and returns the line group highway number (step 294).

d. READ LINE NUMBER Operation

A READ LINE NUMBER operation is performed by the line switch controller 36 to retrieve from the voice path assignment table (FIG. 8) the line group and line card number associated with a particular port group highway and time slot channel.

In performing the read line number operation, the line switch controller 36 uses port group highway and time slot channel identified by the input program to address the voice path assignment table (FIG. 8, step 300) to obtain the corresponding line group and line card numbers. The line switch controller then sets the program return status to "success" and returns to the calling program (step 302).

e. RELEASE Operation

In a RELEASE operation, the telephone call is terminated, and the line group highway number in the associated port group highway time slot RAM 60 (FIG. 2A) is nullified.

In executing the release operation, the line switch controller transfers a port group highway number and time slot channel number to data register 1 (FIG. 5A), the number "48" (decimal, that is, binary 01100000) into the line group highway field of line group highway switch data register 2 (FIG. 5B, step 310) and a WRITE command to the SOC(4:1) operation code field of the command register (FIG. 5C). The line group highway switch then loads the number "48" into the PGH time slot RAM 60 in the addressable storage location identified by the time slot channel identified in data register 1. The number "48" associated with the line group highway channel indicates that that number is idle.

After step 310, the line switch controller then sequences to step 258 in FIG. 10A.

f. ASSIGN SOURCE Operation

The ASSIGN SOURCE operation is used by the line switch controller to cause a particular signal source, for example, a specified tone, to be connected to an existing path.

In executing the ASSIGN SOURCE operation, the line switch controller 60 first transfers the port group highway and time slot channel to data register 1 (FIG. 5A, step 320) and the line group highway to the data register 2 and a WRITE command to the command register (FIG. 5C), and waits for the DONE bit of the status register (FIG. 50) to be set (step 322). If the DONE bit is set within a time-out period, the line switch controller then sets the program return status to "success" (step 324) and returns to the calling program. If the DONE bit is not set within the time-out period (step 326), the line switch controller sets the error flag (step 328) and the return status to "fail" (step 330) and returns to the calling program.

E. Call Processing Operation

With this background, the call processing operation of the system depicted in FIG. 1 will be briefly described. With reference to FIG. 1, each line group controller 32 monitors the subscriber lines connected to it to determine when a telephone goes off-hook. The line group controller 32 transfers an OFF-HOOK message to the line switch controller 38, which marks that line "busy" and searches for an idle time slot channel on the line group highway connecting that line group to the line group highway switch, and on a port group highway connecting the line switch 12 to central office 10 (see FIGS. 9A and 9B). If no time slot channels are available, the time slot request is queued (for example, FIG. 9B, step 226) to initiate another search when a release occurs. This loop is broken by an ON-HOOK message from the line group controller, or by an idle time slot channel being found.

When the line switch controller obtains an idle time slot channel, it transfers a MUX/DEMUX ASSIGNMENT message to the line group controller 32 identifying the line group highway and time slot channel to be associated with the subscriber line. The line switch controller also loads the PGH time slot RAM (60) (FIG. 2A) with the indicated time slot channel and line group highway number, sets the appropriate bits in the line group highway busy/idle map (FIG. 6) and port group highway busy/idle map (FIG. 7), and loads the appropriate information in the voice path assignment table (FIG. 8).

The line group controller 32 uses the information from the MUX/DEMUX ASSIGNMENT message to condition line group multiplexer 34 to couple the digitized voice information signals between the subscriber line and the assigned line group highway in the assigned time slot channel. When the path through the line group multiplexer 34 is established, the line group controller 32 sends a MUX PATH ASSIGNED message to the line switch controller and an ORIGINATION message to the call control processor 16.

When the call control processor receives the ORIGINATION message, it enables the central office port in the time slot interchange matrix switch network 18 (FIG. 1) to receive the call. The call processor then causes a dial tone signal to be applied to the channel, receives and analyzes digits, and routes the call to the receiving telephone as explained in the aforementioned U.S. patent application Ser. No. 507,935 U.S. Pat. No. 4,393,495.

The call control processor 16 then identifies the line switch 12 to which the called telephone is connected. If the called telephone is connected to a line switch, the call control processor transmits a TERMINATION message to the line switch controller 36 of that line switch, which identifies the called telephone number. The line switch controller, on receiving of the TERMINATION message, checks the "busy" status of that telephone line, and if the line is busy, returns a CONNECT FAIL message. The call control processor 16 then connects, through the time slot interchange matrix switch network 18, an appropriate tone on the incoming port and time slot channel from the originating telephone.

If the called line is not busy, the line switch controller does a path search (FIGS. 9A and 9B) to locate an idle line group highway time slot channel and, port group highway time slot channel between central office 10 and, the called subscriber line 28a–28n. If no idle time slot channel is available, the line switch controller then also sends a CONNECT FAIL message to the call control processor 16, which connects a busy tone to the originating time slot for return to the calling subscriber line.

If an idle channel to the called telephone line is found, the terminating line switch controller marks it busy, sets up the line group highway switch, and sends a MUX/-DEMUX ASSIGNMENT command message to the line group controller 32 of the line group connected to the called subscriber line. The line group controller 32 then conditions the line group multiplexer to couple the digitized voice information signals between the called subscriber line and the line group highway in the assigned time slot channel. When the line group multiplexer is so conditioned, the line group controller 32 sends a MUX PATH ASSIGNED message to the line switch controller. The line switch controller then sends a CONNECT message to the call control processor, identifying the port group highway and time slot to the called subscriber line.

The call control processor 16, upon receiving the CONNECT message, connects a ring back tone to the originating line, and sends a RING LINE command to the terminating line switch controller. The terminating line switch controller then sends an RING LINE message to the line group controller to connect ringing voltage to the appropriate line 28a–28n (FIG. 1). The line group controller monitors the line 28a–28n, detects when the called telephone goes off-hook, removes the ringing voltage, and notifies the line switch controller with a RING TRIP message. The call control processor 16 also detects when the called telephone goes off-hook and then connects the calling party to the called party through the time slot interchange matrix switch network 18.

The line group controller, line switch controller, and call control processor are then idle as regards this call, barring the requirement of intervention for errors, until the call is released, that is, until one of the parties goes on-hook. At this time, the call control processor, through the time slot interchange matrix switch network 18, senses when the parties go on-hook. In response to the on hook status, the call control processor sends a DISCONNECT command to the line switch controllers. The line switch controllers receive the DISCONNECT command, mark the time slot channel idle in the busy idle maps (FIGS. 6 and 7) and the voice path assignment table (FIG. 8), as well as in the PGH time slot RAM's 60 (FIG. 2A), and sends a MUX/-DEMUX RELEASE command to the line group controller to release the line group multiplexer time slot.

The foregoing description is limited to a specific embodiment of this invention. It will be apparent, however, that this invention can be practiced in systems that have diverse basic construction or in systems that have different internal circuitry than is described in this specification with the attainment of some or all of the foregoing objects and advantages of this invention. Therefore, it is the object of the appended claims to cover all such variations and modifications as come within the true spirit and scope of this invention.

What is claimed as new and desired to be secured by Letters Patent of the United States is:

1. A telephony network comprising a plurality of subscriber lines, each subscriber line being connected to one of a plurality of line switch means, with each line switch means being connected to a central office over a plurality of port group highways,
   a. each line switch means including:
      (i) line group means connected to a plurality of subscriber lines for converting the voice signals between analog and digital form;
      (ii) a plurality of line group highway means connected to said line group means for transferring the digital voice signals from and to the line group means in a plurality of time slot channels;

(iii) line group highway switch means for selectively coupling the digital voice signals between all of the plurality of line group highway means and the port group highways during the time slot channels thereby to permit voice signals to be coupled between any subscriber line and any port group highway during each time slot channel; and (iv) control means for selectively determining for said line group highway switch means a line group highway means, the port group highways and the time slot channels to effect the transfer of the voice signals between said line group highways and said port group highways for each call; and b. the central office means including (i) receiving means connected to the port group highways from all of said line switch means for receiving digital voice signals from and transmitting digital voice signals over said port group highways; and (ii) switch means for switching digital voice signals among said receiving means.

2. A telephony network as defined in claim 1 wherein said line group highway switch means includes:

a. a plurality of selector means each connnected to one of said port group highways and further connected to all of said line group highway means to couple digital voice signals therebetween in said plurality of time slot channels;

b. line group highway switch control means connected to said line switch control means and said plurality of selector means, including:

(i) a time slot random access memory means connected to said selector means including a plurality of addressable storage locations for storing signals representing the correspondence between time slot channels on said line group highway means and said port group highway means; and (ii) address means connected to all said time slot random access memory for identifying the time slot channels being transferred over said line group highway means and said port group highways, said time slot random access memory means transferring said correspondence signals to said selector means to control the selective coupling of digital voice signals between said line group highway means and said port group highways.

3. A telephony network as defined in claim 2 wherein said port group highway also transfers timing signals for synchronizing said network, said address means comprising counter means connected to receive said timing signals and further connected to all of said time slot random access memory means, said counter means generating output signals in response to said timing signals identifying the time slot channels being transferred over said port group highways.

4. A telephony network as defined in claim 2 in which said line switch means further includes means connected to said selector means for generating signals for transfer to the subscriber lines, said time slot random access memory means further including means for storing a function code associated with each addressable storage location, and for transferring the function codes from said function code storage means to said selector means in response to the identification of the time slot channel by said address means to enable said selector means to selectively couple the digital voice signals from the port group highway or a signal from said signal generating means to the line group highway means in response to the function code associated with the time slot channel.

5. A telephony network as defined in claim 1 in which said line switch control means includes:

a. line group highway busy/idle map means for storing, in a plurality of addressable storage locations, a word comprising a plurality of bits, each bit indicating the condition of a time slot channel carried by a line group highway means;

b. port group highway busy/idle map means for storing, in a plurality of addressable storage locations, a word comprising a plurality of bits, each bit indicating the condition of a port group highway for a time slot channel; and c. voice path assignment table means for storing, in a plurality of addressable storage locations, the number of idle channels and the identification of the subscriber line associated with each port group highway and time slot channel.

6. A telephony network as defined in claim 5 in which said line switch control means further comprises means for selecting an idle time slot channel on a port group highway and line group highway means for transferring voice signals originating on a subscriber line, comprising:

a. means for retrieving from said voice path assignment table means the word identifying the number of idle channels remaining;

b. means for sequentially retrieving words from said port group highway busy/idle map means if there are any idle channels remaining and for identifying a port group highway and idle time slot channel;

c. means for retrieving words from said line group highway busy/idle map means relating to the line group highway means connected to the subscriber line and for testing the bit of the retrieved words corresponding to the idle time slot channel identified by the port group highway word retrieving means; and d. means for transferring the identification of the idle time slot channel, port group highway and line group highway to the line group highway switch means if an idle time slot channel is identified.

7. A line group highway switch for use in a line switch connected to a plurality of lines in a telephony network, the line switch being connected to transfer digitized voice information signals between said lines and a central office over a lesser plurality of port group highways in a plurality of sequential time slot channels, said line group highway switch comprising:

a. a plurality of selector means each connected to one port group highway and to all of said lines to couple digitized voice information signals between a line and a port group highway during a time slot channel; and b. control means connected to all of said selector means to identify the line whose digitized voice information signals are to be coupled to a port group highway during each sequential time period.

8. A line group highway switch as defined in claim 7 wherein said control means includes:

(i) a time slot random access memory means connected to each selector means for storing an identification of the line group highway means to be coupled to the port group highway during each time slot channel; and (ii) address means connected to all of said time slot random access memory means for sequentially identifying the time slot channels being transferred over the line group highway means and said port group highways, said time slot random access memory means transferring said line group highway identification to said selector means in response to the identification of the time slot channel.

9. A line group highway switch as defined in claim 8 wherein said port group highway also transfers timing signals for synchronizing said network, said address means comprising counter means connected to receive said timing signals and further connected to all of said time slot random access memory means, said counter means generating output signals in response to said timing signals identifying the time slot channels being transferred over the port group highways.

10. A telephony network as defined in claim 6 wherein said selection means further includes means for decrementing the contents of the word identifying the number of idle channels remaining in response to the identification of an idle time slot channel.

11. A telephony network as defined in claim 10 further including marking means for marking busy the contents of the port group highway busy/idle map and line group highway busy/idle map associated with the selected idle time slot in response to the selection thereof.

12. A telephony network as defined in claim 11 further including release detection means for when a subscriber line goes on-hook, said marking means further including means for marking idle the contents of the port group highway busy/idle map and line group highway busy/idle map associated with the time slot associated with the call, and further including means for incrementing the contents of the word identifying the number of idle channels remaining, in response to the release detection means detecting that a subscriber line has gone on-hook.

13. A telephony network as defined in claim 2 wherein said time slot random access memory means includes a plurality of memory modules each connected to one of said selector means, each storage location of each memory module being associated with one time slot channel and storing the identification of a line group highway means so that, when each location is addressed by said address means, the selector means connected to the memory module couples the digital voice signals between the line group highway means identified by the contents of the addressed location and the port group highway connected to the selector means.

14. A line switch for connection to a telephony network over a plurality of port group highways including:
   a. line group means connected to a plurality of subscriber lines for converting voice signals between analog and digital form;
   b. a plurality of line group highway means connected to said line group means for transferring the digital voice signals from and to the line group means in a plurality of time slot channels;
   c. line group highway switch means connected to said plurality of group highway means and the plurality of port group highways for selectively coupling the digital voice signals between all of the plurality of line group highway means and the plurality of port group highways during the time slot channels thereby to permit digital voice signals to be coupled between any subscriber line and any port group highway during each time slot channel; and
   d. control means connected to said line group highway switch means for selectively identifying for said line group highway switch means the line group highway means, the port group highways and the time slots channels to effect the transfer of the digital voice signals between said line group highways and the port groups highways.

15. A line switch as defined in claim 14 further including:
   a. a plurality of selector means each connected to one of the port group highways and further connected to all of said line group highway means to couple digital voice signals therebetween in said plurality of time slot channels;
   b. line group highway switch control means connected to said line switch control means and said plurality of selector means, including:
      (i) a time slot random access memory means connected to said selector means including a plurality of addressable storage locations for storing signals representing the correspondence between time slot channels on said line group highway means and said port group highway means; and
      (ii) address means connected to all said time slot random access memory means for identifying the time slot channels being transferred over said line group highway means and said port group highways, said time slot random access memory means transferring said correspondence signals to said selector means to control the selective coupling of digital voice signals between said line group highway means and said port group highways.

16. A line switch as defined in claim 15 wherein said time slot random access memory means includes a plurality of memory modules each connected to one of said selector means, each storage location of each memory module being associated with one time slot channel and storing the identification of a line group highway means so that, when each location is addressed by said address means, the selector means connected to the memory module couples the digital voice signals between the line group highway means identified by fhe contents of the addressed location and the port group highway connected to the selector means.

17. A line switch as defined in claim 15 wherein said port group highway also transfers timing signals for synchronizing said network, said address means comprising counter means connected to receive said timing signals and further connected to all of said time slot random access memory means, said counter means generating output signals in response to said timing signals identifying the time slot channels being transferred over the port group highways.

18. A line switch as defined in claim 15 further including means connected to said selector means for generating signals for transfer to the subscriber lines, said time slot random access memory means further including means for storing a function code associated with each addressable storage location, and for transferring the function codes from said function code storage means to said selector means in response to the identification of the time slot channel by said address means to enable said selector means to selectively couple the digital voice signals from the port group highway or a signal from said signal generating means to the line group highway means in response to the function code associated with the time slot channel.

19. A line switch as defined in claim 14 in which said line switch control means includes:
   a. line group highway busy/idle map means for storing, in a plurality of addressable storage locations, a word comprising a plurality of bits, each bit indicating the condition of a time slot channel carried by a line group highway means;
   b. port group highway busy/idle map means for storing, in a plurality of addressable storage locations, a word comprising a plurality of bits, each bit indicating the condition of a port group highway for a time slot channel; and
   c. voice path assignment table means for storing, in a plurality of addressable storage locations, the number idle channels and the identification of the subscriber line associated with each port group highway and time slot channel.

20. A line switch as defined in claim 19 in which said line switch control means further comprises means for selecting an idle time slot channel on a port group highway means for transferring voice signals originating on a subscriber line, comprising:
   a. means for retrieving from said voice path assignment table means the word identifying the number of idle channels remaining;
   b. means for sequentially retrieving words from said port group highway busy/idle map means if there are any idle channels remaining and for identifying a port group highway and idle time slot channels;
   c. means for retrieving words from said line group highway busy/idle map means relating to the line group highway means connected to the subscriber line and for testing the bit of the retrieved words corresponding to the idle time slot channel identified by the port group highway word retrieving means; and
   d. means for transferring the identification of the idle time slot channel, port group highway and line group highway to the line group highway switch means if an idle time slot channel is identified.

21. A line switch as defined in claim 20 wherein said selection means further includes means for decrementing the contents of the word identifying the number of idle channels remaining in response to the identification of an idle time slot channel.

22. A line switch as defined in claim 21 further including marking means for marking busy the contents of the port group highway busy/idle map and line group highway busy/idle map associated with the selected idle time slot in response to the selection thereof.

23. A line switch as defined in claim 22 further including release detection means for when a subscriber line goes on-hook, said marking means further including means for marking idle the contents of the port group highway busy/idle map and line group highway busy/idle map associated with the time slot associated with the call, and further including means for incrementing the contents of the word identifying the number of idle channels remaining, in response to the release detection means detecting that a subscriber line has gone on-hook.

24. A line switch as defined in claim 15 wherein said time slot random access memory means includes a plurality of memory modules each connected to one of said selector means, each storage location of each memory module being associated with one time slot channel and storing the identification of a line group highway means so that, when each location is addressed by said address means, the selector means connected to the memory module couples the digital voice signals between the line group highway means identified by the contents of the addressed location and the port group highway connected to the selector means.

* * * * *